Figure 1:
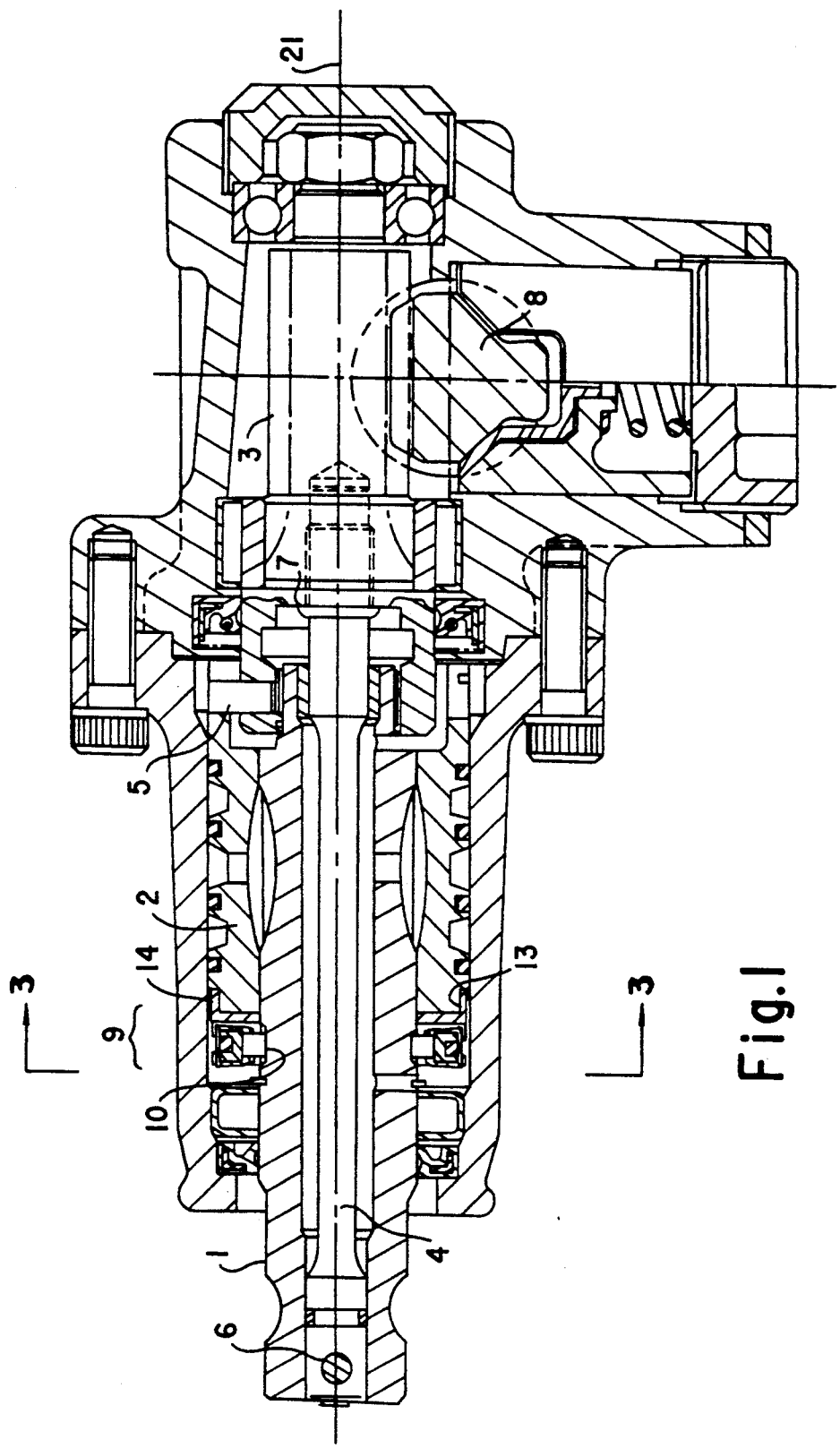

United States Patent [19]

Bishop

[11] Patent Number: 5,251,669
[45] Date of Patent: Oct. 12, 1993

[54] POWER STEERING VALVES

[75] Inventor: Arthur E. Bishop, Northwood NSW, Australia

[73] Assignee: A. E. Bishop & Associates Pty. Limited, New South Wales, Australia

[21] Appl. No.: 879,381

[22] Filed: May 7, 1992

[30] Foreign Application Priority Data

May 24, 1991 [AU] Australia .............. PK6333

[51] Int. Cl.$^5$ .............................. B62D 5/083
[52] U.S. Cl. .............. 137/625.23; 91/375 A; 137/625.24
[58] Field of Search .......... 74/388 PS; 91/375 A; 137/625.23, 625.24; 267/150

[56] References Cited

U.S. PATENT DOCUMENTS 4,819,545 4/1989 Dymond ............. 91/375 A X

FOREIGN PATENT DOCUMENTS

3013535A1 10/1981 Fed. Rep. of Germany .
3634215A1 4/1987 Fed. Rep. of Germany .
2165502A 4/1986 United Kingdom .
2199000A 6/1988 United Kingdom .

OTHER PUBLICATIONS

Sae Technical Paper Series 880706, "Analysis of Stiffness and Feel for a Power-Assisted Rack and Pinion Steering Gear", by John Baxter, A. E. Bishop and Associates, Feb. 29, Mar. 4, 1988.

Primary Examiner—Gerald A. Michalsky
Attorney, Agent, or Firm—Nikaido, Marmelstein, Murray & Oram

[57] ABSTRACT

A hydraulic power steering rotary valve of generally conventional construction characterized in that the on-center characteristics of the valve are governed by an arrangement of rolling elements and notched elements arranged to produce a detent action between the input shaft and the sleeve or driven member, the rolling elements rolling between opposite surface contours of a pair of opposed notched elements, the contours each including a convex surface the shape of which is such that a centering torque between the input shaft and the sleeve or driven member is produced which decreases for increasing amounts of rotation away from a neutral condition of the rotary valve.

13 Claims, 10 Drawing Sheets

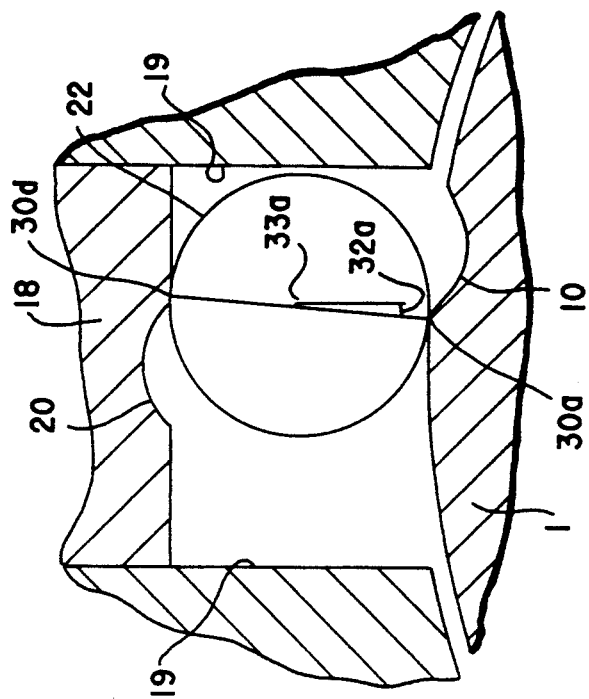
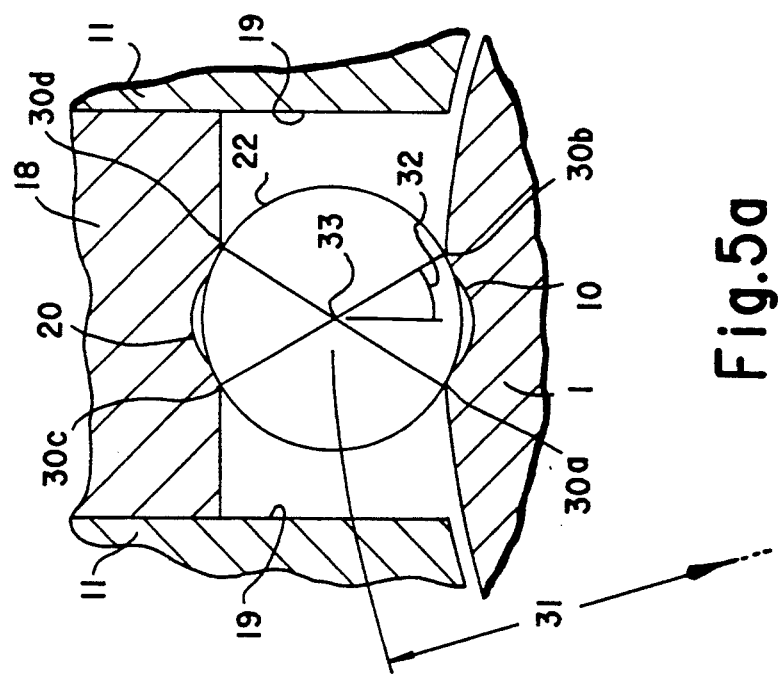

Fig.8
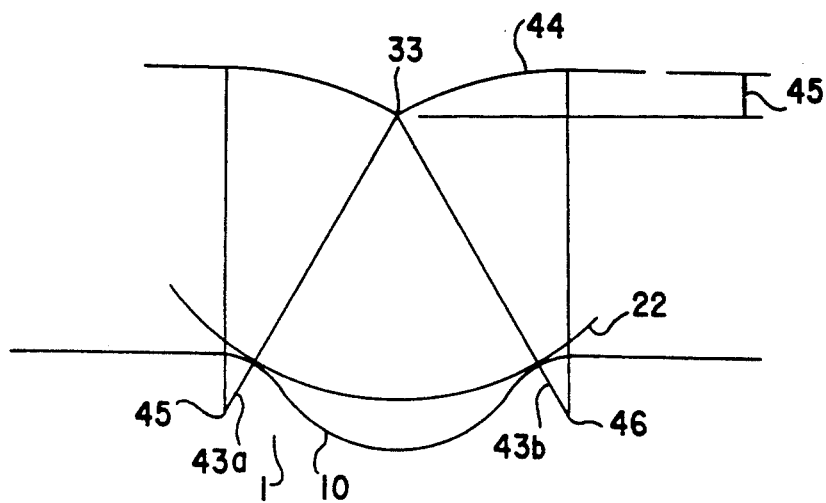
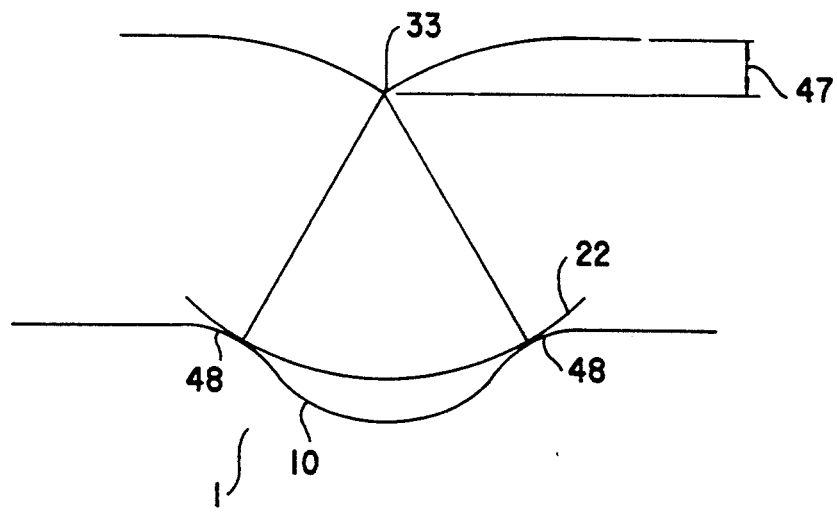
Fig.9

POWER STEERING VALVES

This invention relates to hydraulic power steering gears for motor vehicles and, in particular, to the rotary valves used in such steering gears.

Typically rotary valves for hydraulic power steering include an input-shaft, usually connected to the steering wheel of the vehicle by a flexible joint, and having in its outer periphery a plurality of blind ended, axially extending grooves separated by lands. Journalled on the input-shaft is a sleeve having in its bore an array of axially extending blind ended slots matching the grooves in the input-shaft, but in underlap relationship thereto, the slots of the one being wider than the lands of the other so defining a set of axially extending orifices which open and close when relative rotation occurs between the input-shaft and the sleeve. These orifices are ported as a network such that they form sets of hydraulic Wheatstone bridges which act in parallel.

Drilled passages in the input-shaft and sleeve, together with circumferential grooves in the periphery of the sleeve, serve to communicate oil between the grooves in the input-shaft and the slots in the sleeve, an engine driven oil pump, and right-hand and left-hand hydraulic assist cylinder chambers incorporated in the steering gear.

A torsion bar incorporated in the input-shaft serves to urge the input-shaft and sleeve towards a neutral, centred condition when no power assistance is required. When input torque is applied by the driver to the steering wheel, the torsion bar deflects, causing relative rotation of the sleeve and input-shaft from the neutral condition. This so called "valve operating angle" imbalances the sets of hydraulic Wheatstone bridges and hence causes a differential pressure to be developed between the right-hand and left-hand hydraulic assist cylinder chambers. The "boost characteristic" of the rotary valve, that is the functional relationship between the above mentioned input torque and differential pressure, is determined for a given steering gear application by the geometry of axially extending contours formed on the edges of the grooves of the input-shaft adjacent to its outside diameter.

The general method of operation of such conventional rotary valves is well known in the art of power steering design and so will not be described in any greater detail in this specification. An excellent description of this operation is contained in U.S. Pat. No. 3,022,772 (Zeigler), commonly held as being the "original" patent disclosing the rotary valve concept.

During "on-centre" driving such as typical medium or high speed freeway situations, where valve operating angles are a maximum of perhaps 0.3 degrees, the presence of the torsion bar in such valves significantly degrades the stiffness of a power steering gear compared to its manual (non power assisted) counterpart. This is because the torsion bar is, by far, the most compliant element in the mechanical drive train in the steering gear and very little "hydraulic stiffness" is generated by the servo action of the steering gear, due to the low levels of hydraulic assist pressure associated with the on-centre operating region of the power steering valve. The stiffness of a rotary valve actuated rack and pinion power steering gear is studied in detail in documents such as "Analysis of Stiffness and Feel for a Power-Assisted Rack and Pinion Steering Gear" (SAE Technical Paper No. 880706) where it is shown that the on-centre stiffness of such a power steering gear is typically 5-10 times lower than that of the equivalent manual steering gear.

The dominant effect of torsion bar compliance on the overall on-centre stiffness of a steering gear is well recognised in the power steering industry. In a conventional rotary valve it is of course possible to utilise a stiffer torsion bar in the valve however, in order to maintain acceptably low steering effort levels during cornering and parking, the inevitable result is a proportional decrease in the valve operating angle. This increases the accuracy requirement for the power steering valve componentry, in particular the geometric precision of the afore-mentioned axially extending contours formed on the edges of the grooves in the input-shaft and the matching edges of the blind-ended slots in the sleeve. Also balancing or centring of such valves, a manufacturing assembly operation in which the input-shaft and torsion bar are pinned in a highly accurate angular orientation such that the boost characteristic is symmetrical for left-hand and right-hand input torques, is much more difficult to control for stiffer torsion bars. These manufacturing problems, combined with the greater stress levels associated with such stiff torsion bars for a given axial length, limit the stiffness of practical torsion bars in a conventional rotary valve to a maximum of about 2 Nm./degree.

For this reason, over the last 10 years, new power steering valve systems have evolved which enable a torsion bar of practical stiffness to be utilized, however this torsion bar augmented by a centring mechanism which acts to preload the valve to its neutral condition. Such systems, theoretically at least, provide effectively infinite torsion bar stiffness up to a threshold input torque beyond which rotational displacement occurs between input-shaft and sleeve elements as occurs in a conventional rotary valve. This threshold input torque is usually arranged to at least encompass that range of torques associated with on-centre driving and hence the steering system will provide essentially a "manual feel" under these conditions, that is maximum precision and feel.

These new systems can be broadly classified into the two categories of pressure modulated and mechanical centring mechanisms.

Pressure modulated centring mechanisms have been used in some prior art speed sensitive valve systems to progressively increase steering efforts with vehicle speed and are of three main types.

Firstly, mechanisms such as those described in U.S. Pat. Nos. 4,819,545 (Dymond) and 4,593,783 (Honaga et al.) rely upon balls trapped between opposed sets of triangular notches in two relatively axially slideable plungers in the rotary valve and mutually urged together (or relieved) by hydraulic pressure acting on the plungers. Normally one of the notched plungers is rigidly rotationally attached to the input-shaft and the other to either the sleeve or pinion. This mechanism therefore effectively forms a rotational detent between the sleeve and input-shaft and the centring torque between these components, corresponding to the threshold torque of the detent, is constant for the entire operating angle of the valve for a given hydraulic pressure. This constant centring torque algebraically adds to the linearly increasing centring torque of the torsion bar and can be modulated by varying the magnitude of the hydraulic pressure via a control valve. Such arrangements add substantial axial length, typically 20 mm, to the rotary valve. Moreover, since essentially point contact exists at the interface between the balls and the notches, very high Hertzian stresses will be involved, tending to limit the working life of such a device. Extreme precision in locating the notches in the opposed plungers is required if a "dead area" of response is to be avoided in on-centre driving Secondly, mechanisms such as those described in UK Patent 2,199,000 (Adams) and U.S. Pat. Nos. 4,593,783 (Honaga et al.), 4,619,339 (Futaba et al.), 4,651,622 (Yoshida), 4,759,420 (Schipper et al.) and 4,796,715 (Futaba et al.) also rely on a detent, however this detent is arranged radially rather than axially. The plungers consist of balls or spherically tipped pistons which slide in accurate radial bores in the sleeve or pinion, and are urged by hydraulic pressure into notches on the outside diameter of the input-shaft. The detent action is similar to the previous case except that, because no rolling takes place, a large amount of friction occurs at the sliding detent interface which produces corresponding hysteresis in the valve boost characteristic. This friction, exacerbated by again the high Hertzian contact stresses characteristic of the essentially point contact between the balls and notches, will tend to generate high levels of wear and hence fast degradation of the contact surfaces. In mechanisms such as described in U.S. Pat. Nos. 4,593,783 (Honaga et al), 4,619,339 (Futaba et al) and 4,651,622 (Yoshida) it is virtually impossible to utilize a cylindrical contact surface on the tips of the pistons because the axi-symmetric geometry of the piston would make it difficult to maintain the orientation of such cylindrical surfaces parallel with the axis of the respective notches. Such cylindrical contact surfaces would result in line (rather than point) contact with corresponding much reduced Hertzian stresses and levels of wear. The other major disadvantage of this radial arrangement of plungers is that it not only increases the axial length of the rotary valve but also its diameter in many cases.

Thirdly, mechanisms such as those described in U.S. Pat. Nos. 4,637,484 (Ijiri et al.), 4,681,184 (Suzuki et al.) and 4,905,784 (Yamashita) employ two parallel sets of opposing trapped pistons which, under hydraulic pressure, exert a centring torque between the input-shaft and the sleeve or pinion to augment the torsion bar. Protrusions on the ends of the pistons contact opposing sides of radial extensions on the input-shaft and the centring force is therefore proportional to the modulation pressure. This class of mechanism is relatively friction free however the incorporation of the four pistons results in significant additional axial length in the valve and also the necessity for the valve to be much larger in overall diameter. This exacerbates the problem of synchronizing the action of the four pistons and, without such synchronization, will lead to the earlier referred to "dead area" of response during on-centre driving.

All three classes of pressure modulated centring systems share the common disadvantage of the complexity of the hydraulic actuation, generally requiring additional porting and seals within the rotary valve and solenoid or stepper motor driven modulation valves interposed in the hydraulic connections to the rotary valve. Some systems even employ a separate hydraulic pump to supply oil pressure to the plungers. Supply of hydraulic modulation pressure to the valve at high speed, via additional seals etc., inevitably results in these systems exhibiting more on-centre friction than a conventional rotary valve. Also, although the complexity and hence high manufacturing cost of these systems is perhaps justified in some speed sensitive valve applications where it is necessary to vary the centring torque as a function of vehicle speed, many speed sensitive and indeed all non speed sensitive applications are ideally served by a centring mechanism which provides the previously described constant threshold input torque consistent with optimum on-centring driving precision and feel.

Prior art mechanical centring mechanisms are all aimed at providing such a constant threshold input torque, typically 0.5-1.0 Nm to null any torsion bar deflection during on-centre driving, and require no additional hydraulic sub-systems for their actuation. Again they fall into three major categories.

Firstly, mechanisms such as those described in UK Patent 2,165,502 (Adams) and U.S. Pat. No. 4,428,399 (Masuda) rely upon a large "C-spring" which circumferentially envelopes the rotary valve and is intended to either augment the torsion bar or, alternatively, actually replace the torsion bar. Radial pins extending from the pinion (or sleeve) and the input-shaft are doubly-trapped and preloaded in an axially aligned position between the two adjacent arms of the C-spring, and a threshold input torque must therefore be applied to the input-shaft before any valve operating angle is generated. C-spring arrangements have the disadvantage that their deflection must encompass not only the entire normal valve operation angle (typically +/− 4 degrees) but must be designed not to be overstressed at the so called "fail safe" angle (typically +/− 7 degrees). This large fail safe angle is determined by a lost-motion drive arrangement in conventional rotary valves which mechanically limits valve operating angle in the event of torsion bar breakage or loss of hydraulic supply from the pump. In order that the C-spring provide the earlier stated threshold input torque of 0.5-1.0 Nm, it must be axially long (measured parallel to the axis of the rotary valve) in order to avoid overstressing at the fail safe angle of about 7 degrees, and therefore results in additional axial length of the rotary valve. Also, if the C-spring arrangement is used to augment, rather than replace the torsion bar, manufacturing problems exist relating to the aforementioned balancing operation and ensuring that the valve operating centre defined by the torsion bar is accurately aligned with the operating centre defined by the C-spring. These design and manufacturing problems have meant that this technology has not been widely adopted in the industry.

Secondly, the mechanism described in U.S. Pat. No. 4,774,847 (Breitweg) relies on balls trapped between opposed sets of triangular notches in two relatively axially slideable plungers and, in this sense, this arrangement is similar to the pressure modulated mechanism already described in reference to U.S. Pat. No. 4,593,783 (Honaga et al.). However the entire arrangement is axially miniaturized and envelopes the torsion bar, hence forming a torsion bar assembly which can be balanced using normal manufacturing operations. The moveable plunger is urged towards the fixed plunger by a bellows spring which also serves to rotationally fix the moveable plunger to the appropriate end of the torsion bar assembly. Because the entire assembly is packaged inside the input-shaft, as per a torsion bar in a conventional rotary valve, the input-shaft must be essentially tubular in order to accommodate the assembly's diameter (typically about 16 mm). To date this arrangement has been employed in ZF valves with a 22 mm input-shaft outside diameter. It would be difficult to miniaturise the assembly further so that it could be employed in the majority of power steering valves which employ input-shafts with less than 21 mm outside diameter. Also, again the use of miniature balls to achieve the detent action results in high Hertzian contact stresses. These facts, combined with the complexity of the detented torsion bar assembly, means that the marginal cost of the system is high and it cannot be practically offered as an "add-on" feature to a conventional diameter rotary valve. In another ZF mechanical centring mechanism shown in German Patent No. 3,634,215 (Breitweg) a similar principle of balls trapped between opposed sets of triangular notches is also used. However, in this latter patent, a single set of notches are used, one notch machined on the axial end face of the sleeve and the opposing notch formed on a spring steel collar which is clamped onto the outside diameter of the input-shaft. This assembly, however, would be expected to be relatively torsionally compliant and therefore add little on-centre stiffness to that of the torsion bar. As in the case of U.S. Pat. No. 4,774,847 (Breitweg), the simple parallel sided double V notch arrangement means that the deflection of the resilient member must encompass the entire "fail safe" angle of the power steering valve. The resilient member must therefore store an appreciable amount of strain energy and is therefore difficult to miniaturise and still avoid overstressing during the many millions of operating cycles expected during the life of a power steering valve.

Thirdly, the mechanism described in German Patent 3,013,535 (Jablonsky) includes a diametrically disposed column of sheet steel which axially deforms by buckling when an input torque exceeding a given threshold is applied to the input-shaft. This threshold is determined by the kinematics of the mechanism and the column strength of the sheet steel element. The appropriate centring torque, which is relatively large up to the point of buckling, then reduces as progressive buckling deformation occurs. Buckling is, by its very nature, a difficult phenomena to accurately analytically predict and is very much a function of parameters which, in a production environment, will be very hard to control. For example, as acknowledged in the patent itself, any small preset bend in the column element will drastically reduce the buckling strength of this element and therefore reduce the resulting threshold input-torque. For these reasons we believe this mechanism has never been utilized in production.

In light of the shortcomings of the prior art, the aim of the present invention is to provide a centring mechanism capable of incorporation into a conventional speed sensitive or non speed sensitive rotary valve of standard outside diameter, typically about 37.5 mm. The device should also introduce minimum additional length to the rotary valve and be useable as an "add on" or optional feature to improve the on-centre performance of an otherwise standard format rotary valve. As explained earlier, the centring mechanism is aimed at preloading the valve to its neutral condition up to a threshold input torque of 0.5-1.0 Nm (approximately) consistent with on-centre driving. Precision and feel under these circumstances will only be optimized if valve friction is also absolutely minimized. An entirely mechanical detent system employing only rolling contact is consistent with this aim and is therefore one element of this invention. The limitation of all prior art mechanically actuated centring mechanisms is the ability of the spring element to provide the required threshold torque on-centre and yet not be overstressed at the valve fail-safe angle of about 7 degrees. This problem fundamentally relates to the strain energy storage capacity in a given volume of spring steel and is addressed in the present invention by avoiding the need for a linear, or near linear, buildup in centring force as a function of valve operating angle after the threshold input torque has been exceeded. As seen, prior art mechanically actuated detent-based centring systems inherently exhibit this linear relationship which means that excessively large amounts of energy are stored in the spring element compared to that commensurate with that necessary to achieve the required threshold input torque.

The present invention consists in a rotary valve for a power steering gear comprising an input-shaft, a sleeve, a driven member and an entirely mechanically actuated centring mechanism, the centring mechanism comprising one or more rolling elements, each disposed between a pair of opposed notched elements, one notched element of each pair being rotationally fixed with respect to or integral with the input-shaft and the other notched element of each pair being rotationally fixed with respect to or integral with the sleeve or the driven member, each pair of opposed notched elements being urged together by spring means to trap one of the rolling elements between them, thereby producing a detent action between the input-shaft and the sleeve or driven member, whereby relative rotation occurs between the input-shaft and the sleeve or driven member only upon application of an input torque exceeding a predetermined threshold, characterised in that, after the predetermined threshold input torque has been exceeded, each rolling element rolls between opposite surface contours of the pair of opposed notched elements, the contours each including a convex surface, the shape of which is such that a centring torque between the input-shaft and the sleeve or driven member is produced which decreases for increasing amounts of rotation away from a neutral condition of the rotary valve.

The geometry of the notches, and the appropriate decrease in centring torque, has the effect of limiting the deflection of the springs, compared to the prior art cases where the notches are triangular in shape and hence result in no such decrease. This consequentially limits the strain energy needed to be stored in the springs and hence permits a practical, more compact, design of such springs. In fact it is preferred to arrange the geometry of the notches such that their relevant contacting surface with the rolling elements for large operating angles, not associated with on-centre driving, becomes parallel with the direction of relative displacement between the input-shaft and sleeve (or driven member). This results in the centring torque actually reducing to zero meaning that, for such large valve operating angles, no augmentation of the torsion bar occurs. Hence a standard range of valve operating angles can be used in the design of the rotary valve (typically 4 degrees as stated earlier), not necessarily reduced with the aforementioned manufacturing disadvantages. In this situation where the centring torque is arranged to reduce to zero, abutments are provided on the parallel section of the notches thereby limiting the excursion of the rollers and to ensure their re-entry into the notches as the valve returns to its neutral condition.

It is also preferred that the rolling element is cylindrical in shape and makes essentially line contact with prismoidally shaped notches in the notched elements.

This reduces the Hertzian stresses between the contour of the notches and a given diameter rolling element, and hence considerably reduces the diameter of the rolling element compared to an equivalently stressed spherical element.

The use of line contact means that the contour of the notches may be chosen to have a substantially smaller radius than that of the rolling element, even approaching a sharp edged contour, yet the stresses at the point of contact will not exceed the limit for practical engineering materials (for example, hardened steel). Thus it is also preferred that the geometry of the notch contours is V-shaped up to the point immediately adjacent to the line of contact with the rolling element when the detent is centred. However, when the threshold torque is exceeded, the rolling element rolls around a small radius on the contour and results in the locus of the centre of the rolling element being arcuate at a radius only slightly larger than that of the rolling element. This fact, combined with the use of small diameter rolling elements, again serves to limit the necessary deflection of the spring after the threshold input torque has been exceeded and hence reduces the size of the spring and enables the centring mechanism to be more practically packaged into a standard rotary valve arrangement.

It is preferred that the centring mechanism is arranged with the detent acting essentially radially with respect to the central axis of the rotary valve and the axes of the cylindrical rolling elements, and the corresponding prismatic notches of the notched elements, arranged parallel with this axis. The centring mechanism can be positioned at either end of the sleeve and arranged to act directly between the input-shaft and sleeve to augment the torsion bar. The input-shaft incorporates two diametrically opposed, axially aligned notches on its outside diameter, and forms the inner notched element.

In a first preferred embodiment, the carrier is positioned on the end face of the sleeve and this carrier includes two diametrically opposed, radially extending grooves. Each such groove incorporates a rectangular notched plunger which radially slides in the groove with virtually zero side clearance. A rolling element is trapped between the notch in each plunger and the adjacent notch on the outside diameter of the input-shaft. Two crescent shaped arms are located in a circumferential groove which extends around the outside diameter of the carrier. The centre of each arm contacts the radially outermost face on each plunger. Hooks formed on the extremities of each arm are respectively connected by coil tension springs which urge the two arms and, hence, the two plungers mutually towards the centre axis of the valve. This loads each cylindrical roller between its respective notch on the plunger and its adjacent notch on the outside diameter of the input-shaft and, for input torques not exceeding the threshold input torque of the detent, four-line contact occurs on each of the two rolling elements. When input torques exceeding this threshold are applied, the notched plunger is radially driven out against the reaction force due to the spring load and the rolling element rolls in two-line contact between adjacent notches as valve operating angle occurs. A mechanical balancing operation is carried out during manufacturing of the rotary valve to ensure that the angular orientation of the carrier on the end face of the sleeve is such that the four-line contact occurs between the rolling element and its adjacent contacting notches for zero input torque. Also this balancing operation ensures that the threshold input torque for left-hand and right-hand manoeuvres is approximately equal, and aligned with the neutral condition defined by the boost characteristic for the valve.

This arrangement packages within the cylindrical surface defined by the outside diameter of a standard sleeve and adds minimum additional length to the rotary valve. It can therefore be included as an "add-on" or optional feature to improve the stiffness and feel of a standard rotary valve.

In a second preferred embodiment of the present invention, the carrier is flat faced and attached to the end face of the sleeve by screws, or other securing means. The notched plungers are loaded radially inwardly by two C springs which contact the radially outermost face of the plungers. The notched plungers, rolling elements and C springs are axially restrained via a cover plate which also acts as a non rotating washer and locking tab for the attachment screws. The mounting holes in the carrier are large compared to the major diameter of the attachment screws, or other fixing means, and therefore a small degree of "float" is possible of this carrier with respect to the end face of the sleeve, both radially and also rotationally prior to securing. This ensures that the centring mechanism is precisely rotationally matched to the centring forces supplied by the torsion bar after securing. That is, for zero torsion bar centring torque, the opposed cylindrical rollers are engaged in 4-line contact with the detent notches i.e. 2-line contact with the prismatic notch on the outside diameter of the input-shaft and, simultaneously, 2-line contact with the prismatic notch on the inwardly facing surface of the notched plungers.

Figure 2:
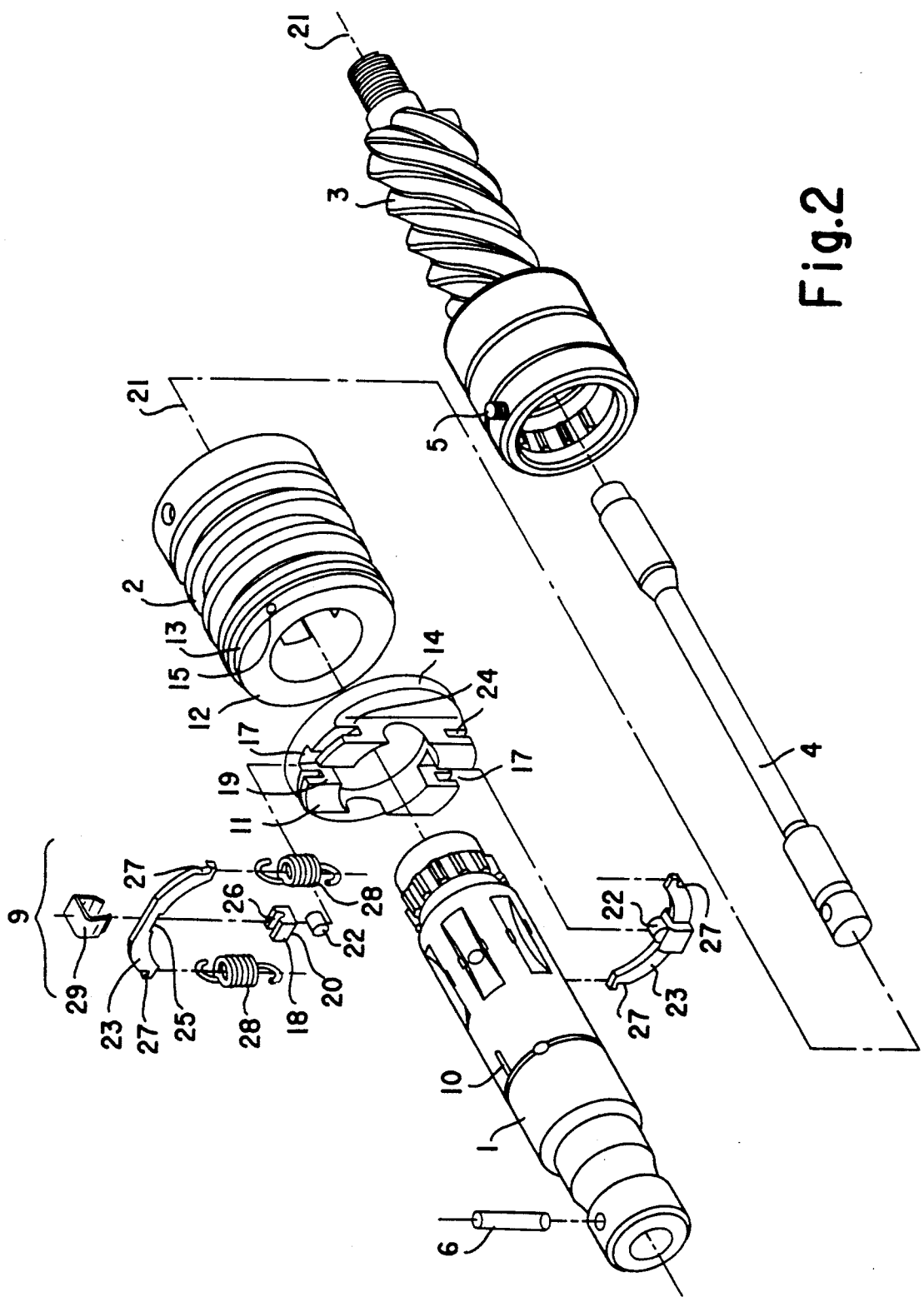
Figure 4:
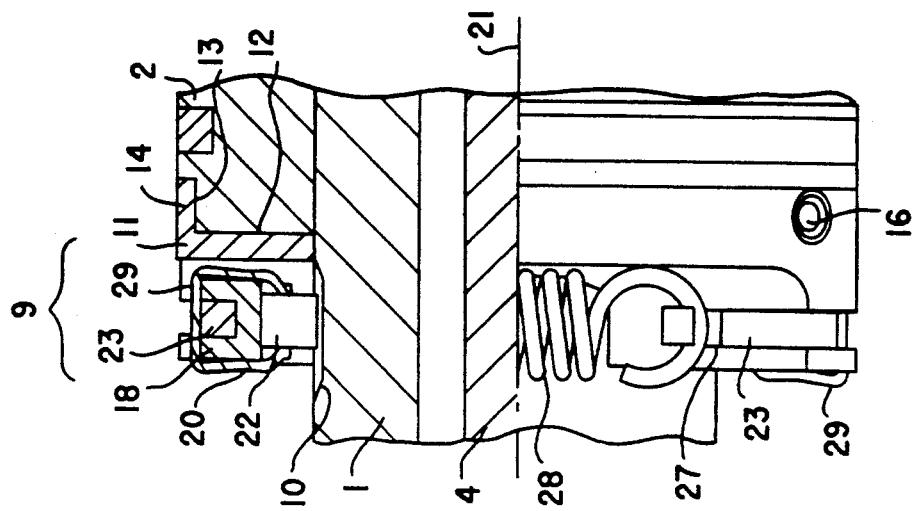
Figure 3:
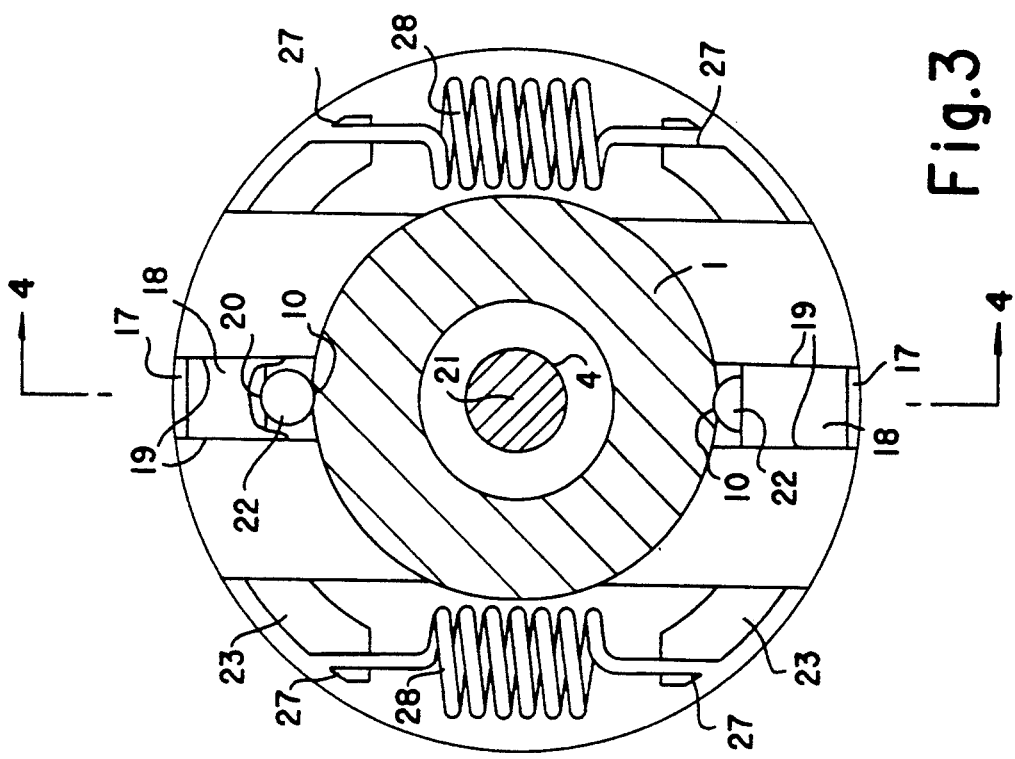
Figure 6:
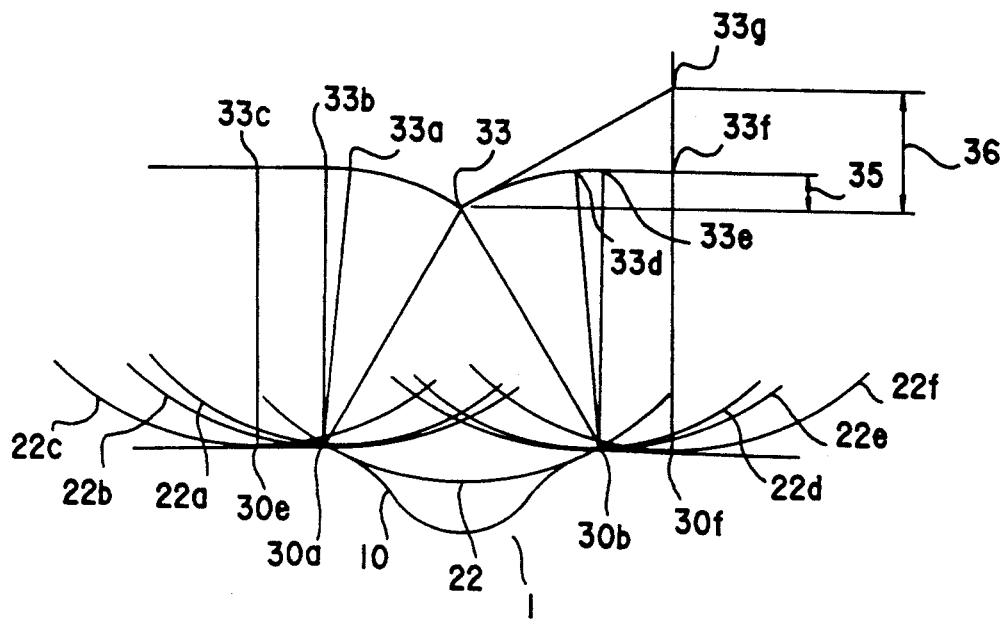
Figure 7:
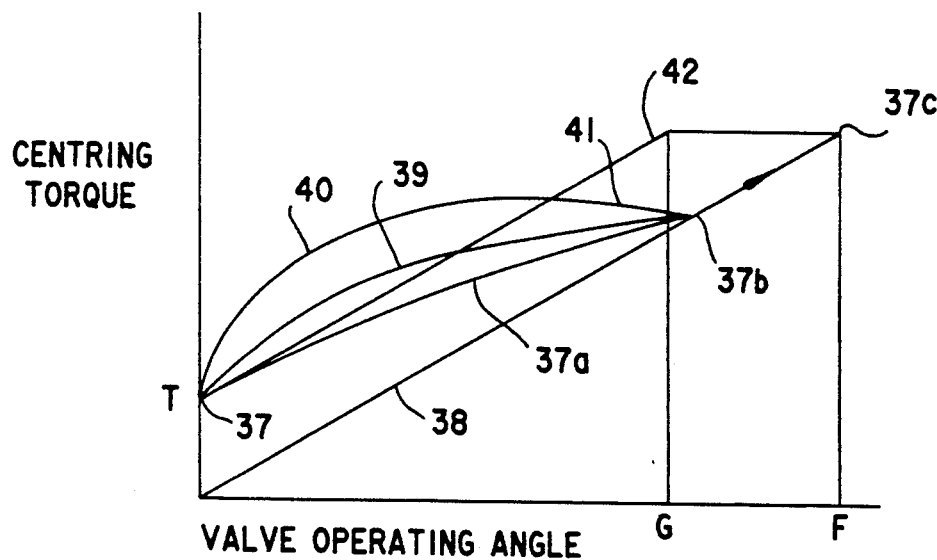
Figure 10:
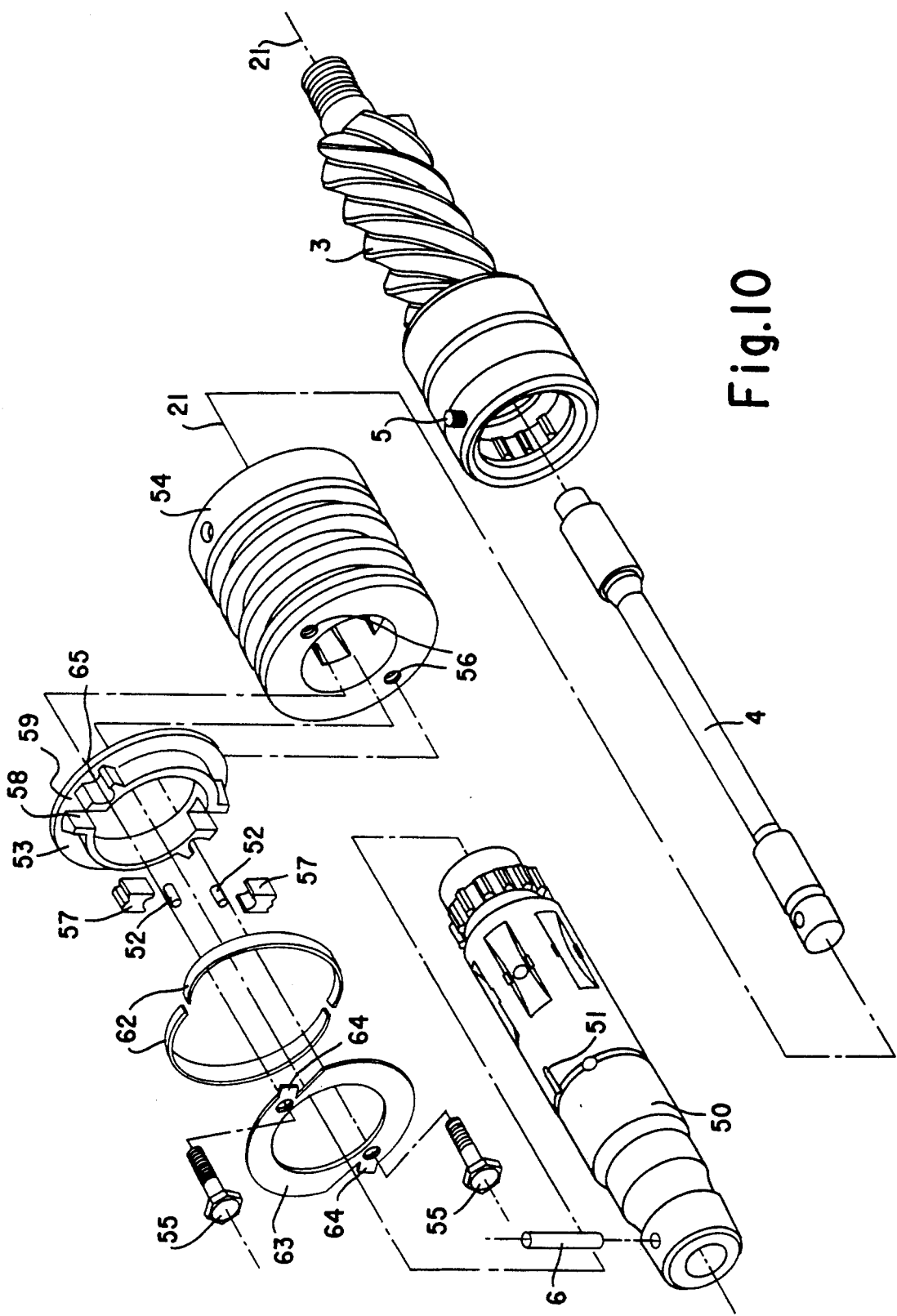
Figure 11:
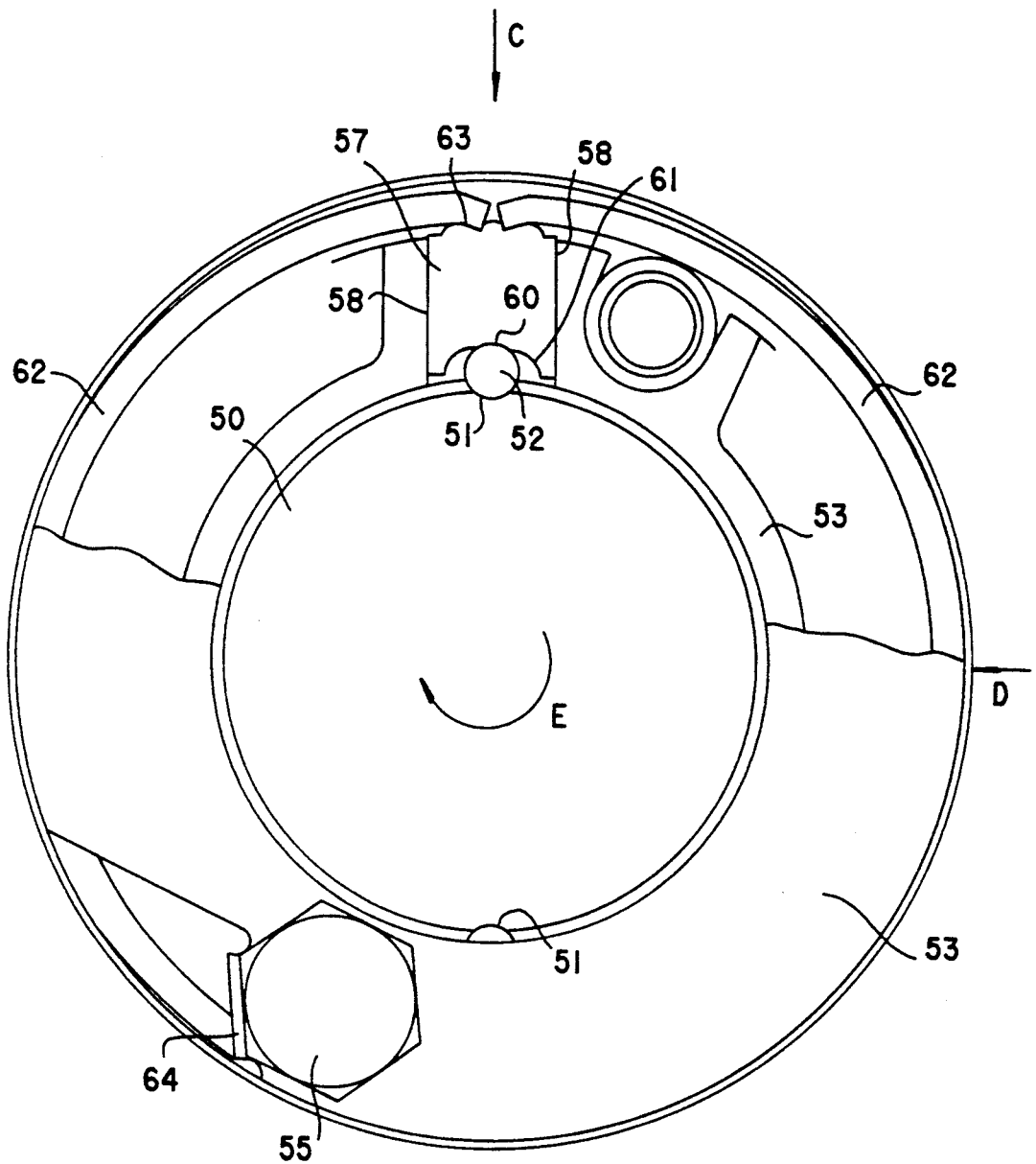
Figure 12:
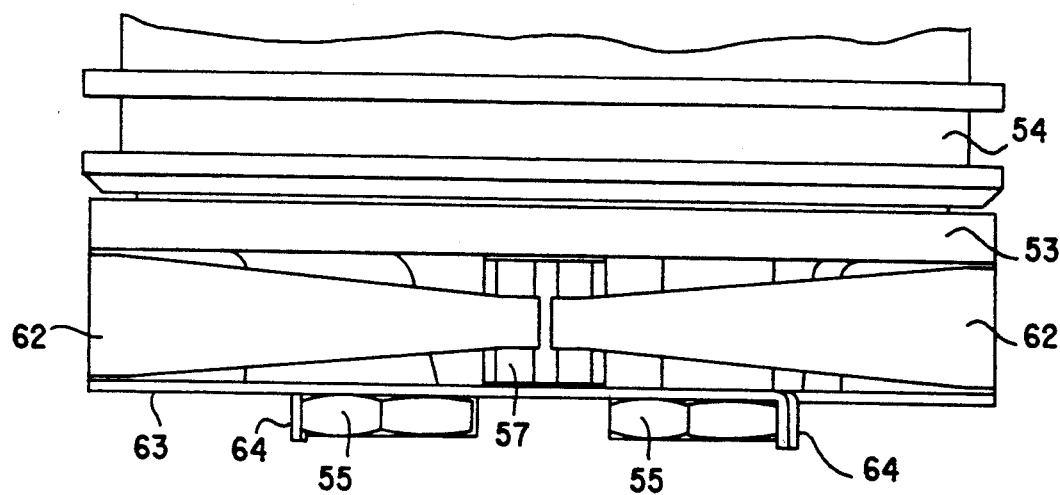
Figure 13:
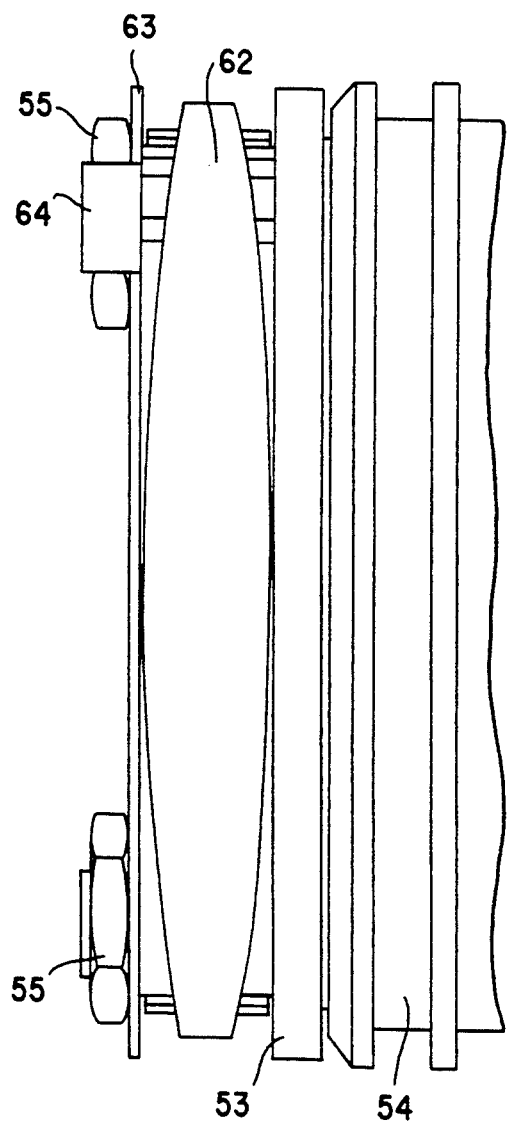
Figure 14:
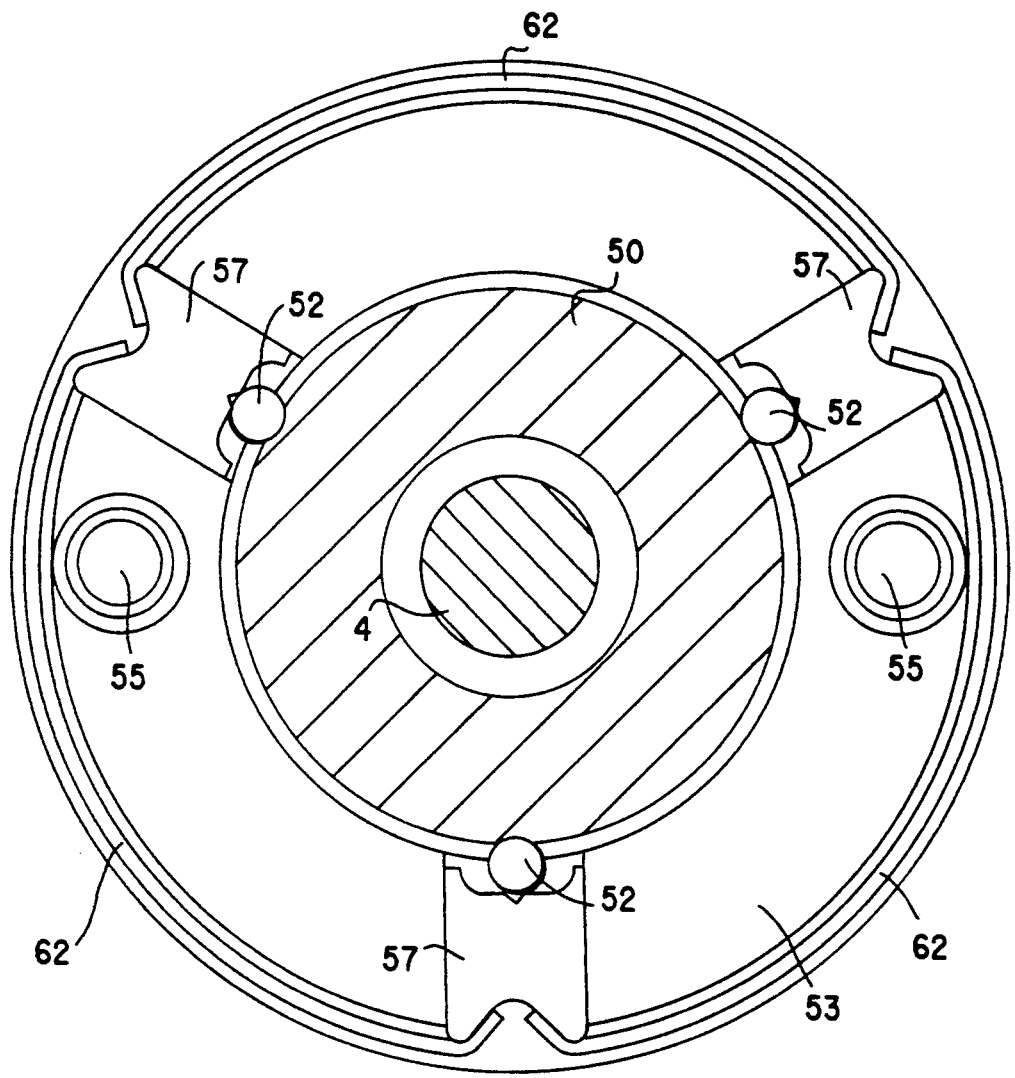

The present invention will now be described by way of example with reference to the accompanying drawings in which:

FIG. 1 is a sectional elevation through a rotary power steering valve incorporating a first embodiment of the invention, FIG. 2 is an exploded isometric view of the rotary power steering valve shown in FIG. 1, showing the details of the assembly of the componentry in the centring mechanism, FIG. 3 is a part sectional end elevation on plane AA in FIG. 1 of the centring mechanism, FIG. 4 is a sectional elevation on plane BB in FIG. 3 of the centring mechanism, FIG. 5a is a sectional end elevation of the notched and rolling elements of the detent arrangement within the centring mechanism when the valve is in the neutral condition, FIG. 5b is a sectional end elevation of the notched and rolling elements of the detent arrangement within the centring mechanism when the valve has been angularly displaced from the neutral condition, FIG. 6 shows details of the locus of the centre of the rolling element as the valve is progressively angularly displaced from the neutral condition, FIG. 7 is a graph which plots centring torque as a function of valve operating angle, FIG. 8 shows details of an alternative notch geometry and the appropriate locus of the centre of the rolling element, FIG. 9 shows details of still another alternative notch geometry and the appropriate locus of the centre of the rolling element, FIG. 10 is an exploded isometric view of a rotary valve incorporating a second embodiment of the invention, FIG. 11 is a part sectional end elevation, viewed parallel to the valve axis, of the centring mechanism according to the second embodiment of the invention, FIG. 12 is a plan view in direction C in FIG. 11, FIG. 13 is an elevation in diameter D in FIG. 11, and FIG. 14 is a modified version of the second embodiment of the invention employing three notched plungers and three interconnecting C springs.

FIG. 1 shows the valve assembly incorporating input-shaft 1 journalled inside sleeve 2 and resiliently connected to pinion 3 (the driven member) by torsion bar 4. Sleeve 2 is rotationally connected to pinion 3 by sleeve drive pin 5, while torsion bar 4 is fixed at its left end to input-shaft 1 by torsion bar pin 6 and fixed at its right end to pinion 3 by swaged connection 7. Therefore an input torque applied at input-shaft 1 angularly deflects torsion bar 4 and causes relative angular displacement between input-shaft 1 and sleeve 2, known as the valve operating angle. The manner in which this valve operating angle serves to produce the hydraulic assistance in the steering gear, and thus impart an axial output force to rack 8, is well understood by persons knowledgeable in the art of power assisted steering gears and will not be detailed further in this description.

The valve assembly also incorporates centring mechanism 9 mounted on the end of sleeve 2 remote from pinion 3. This mechanism is shown in more detail in FIGS. 2, 3 and 4. Centring mechanism 9 is arranged to act directly between input-shaft 1 and sleeve 2 to produce a centring torque between these elements which augments the linear centring torque derived from torsion bar 4. Input-shaft 1 incorporates two diametrically opposed, axially aligned, prismatic notches 10 on its outside diameter. Carrier 11 is positioned against end face 12 of sleeve 2 and centralized on external spigot 13 by the engagement with cylindrical flange 14 of carrier 11. It is angularly and axially secured by deformably staking flange 14 into drill point recesses 15 in spigot 13 as at stake 16. Carrier 11 includes two diametrically opposed, radially extending grooves 17, each groove 17 incorporating a rectangular notched plunger 18 which radially slides along the parallel side faces 19 of groove 17 with virtually zero clearance. Prismatic notches 20 in the radially innermost faces of plungers 18 are also axially aligned with the central valve axis 21. Cylindrical rollers 22 are trapped between notch 20 in each plunger 18 and the adjacent notch 10 on the outside diameter of input-shaft 1. Two crescent shaped arms 23 are located in a circumferential groove 24 which extends around the outside diameter of carrier 11, intersecting with radially extending grooves 17. The central inside surface of each arm 23 includes a small recess 25 which keys into groove 26 in the radially outermost face of plunger 18. Hooks 27 are formed on the extremities of each arm 23 and support tension coil springs 28 which connect adjacent hooks on opposed arms 23, thereby urging together arms 23 and, hence, also opposed plungers 18. U-shaped clips 29 retain cylindrical rollers 22 axially, and also serve to hold the entire centring mechanism together as a single unit to facilitate assembly onto the rotary valve during manufacture.

The urging together of plungers 18 loads each cylindrical roller 22 between its respective notch 20 in plunger 18 and its adjacent notch 10 on the outside diameter of input-shaft 1 as a rolling action detent. For input torques not exceeding the threshold input torque of the detent, four-line contact occurs on each cylindrical roller 22 as at contact points 30 a–d in FIG. 5a. At each contact point 30 a–d, the contour of the respective notch 10 or 20 is tangential to the cylindrical surface of cylindrical roller 22 and, with knowledge of the actual geometry of the detent and remaining componentry of centring mechanism 9, enables simple calculation of the threshold input torque. For the embodiment shown incorporating two cylindrical rollers 22 and two springs 28, each preloaded to a force F in the neutral condition, the threshold input torque T is given by the equation:

$$T = 2F \times radius\ 31 \times \tan(angle\ 32)$$

where radius 31 is the radial distance between valve axis 21 and the centre 33 of cylindrical roller 22, and angle 32 is half the subtended angle of contact points 30a and 30b with respect to centre 33.

When input torques exceeding this threshold are applied to input-shaft 1, plungers 18 are progressively radially driven out against the reaction force applied by springs 28 and the cylindrical rollers 22 roll in two-line contact between adjacent notches in input-shaft 1 and plungers 18 as valve operating angle occurs. These two lines of contact are again shown as contact points 30a and 30d in FIG. 5b. It is also seen that the centring torque resulting from the detent in its now displaced position has considerably reduced, mainly due to the reduction of angle 32 to angle 32a. This is the basic mechanism whereby the centring torque between input-shaft 1 and sleeve 2 is caused to decrease for increasing amounts of valve angle away from the neutral condition, thereby limiting deflection of springs 28.

The geometry relating to this phenomenon is more clearly shown in FIG. 6 which plots the locus of centre 33 of cylindrical roller 22 as it is displaced either side of the neutral condition. For clockwise input torques, cylindrical roller 22 rolls to the left, relative to input-shaft notch 10, through positions 33, 33a, 33b and 33c. Note that position 33a corresponds to that position shown in FIG. 5b where cylindrical roller 22 is about to abut against side face 19 of carrier 11, however further positions 33b and 33c are also quite practical depending upon the actual type of detent action required. For counter clockwise input torques, cylindrical roller 22 rolls to the right, relative to input-shaft notch 10, through positions 33, 33d, 33e and 33f. Because the contour of notch 10 in input-shaft 1 is near-sharp-edged immediately adjacent to contact points 30a and 30b in the neutral condition, portions of locus 33–33b and 33–33e are approximately arcuate about these points respectively, and effectively limit the radial rise of centre 33 of cylindrical roller 22 to distance 35. This corresponds to a deflection of springs 28 of four times this distance. However distance 35 is many times less than distance 36 which corresponds to the radial rise of centre 33 of cylindrical roller 22 if a simple triangular notch was employed, as in prior art mechanical centring mechanisms. Hence deflection of springs 28 is considerably reduced, enabling them to be packaged into carrier 11 mounted on the end face of sleeve 2.

FIG. 7 plots the corresponding relationship of centring torque as a function of valve operating angle, when combined with the linear action of the torsion bar. This combined relationship is plotted as curve 37–37c, the latter point corresponding to the typical rotary valve fail safe angle F of 7 degrees. As seen, the centring force contributed by the centring mechanism is maximum when the valve is in its on-centre or neutral condition, and corresponds to the threshold input torque T as at point 37. This centring torque attenuates with the reduction of angle 32 to zero at point 37b where no further torsion bar augmentation occurs up to the fail safe angle F at point 37c. In other words line 37b–37c is colinear with line 38, corresponding to the simple linear relationship for the torsion bar only.

If springs 28 have an appreciable spring rate, curve 37–37b will tend to bulge upwards indicated as alternative curve 39. This situation is not critical provided that the overall slope of centring torque relationship is always monotonic increasing, as is the case shown. If extremely stiff springs 28 are used in the system curve 39 bulges further to the extent shown as curve 40, resulting in negative slope in the region 41. This will lead to unstable rotary valve actuation, and result in non-continuous increase in valve operating angle for progressive application of input torque by the driver.

It is seen from curve 37–37c that the operating angle of the valve for a given input torque at the fail safe angle F is identical to that for a simple rotary valve incorporating a torsion bar only (i.e. no mechanical centring mechanism). If a triangular notch detent was employed, corresponding to curve 42, it would result in considerably reduced fail safe angle G for the same input torque. As stated earlier this arrangement, used in prior art mechanical centring mechanisms, leads to greater difficulties in manufacture due to the overall reduced valve operating angle (i.e. G versus F).

The near-sharp-edged contour shown in FIG. 6 is optimum in terms of limiting the radial rise distance 35 of centre 33 of cylindrical roller 22. As stated earlier the use of a cylindrical roller, as compared with a spherical member, has the effect of distributing loads along the lines of contact 30a–30d and therefore permitting such near-sharp-edges. If a particular material requirement limits the possible Hertzian stresses to the degree that such near-sharp-edges on the contours of notches 10 and 20 are not feasible, an alternative arrangement can be employed shown in FIG. 8. In this arrangement, near-sharp-edges 30a and 30b are replaced by prismatic fillet radii 43a and 43b and the new locus 44 of the centre 33 of cylindrical roller 22 is now arcuate about the centres 45 and 46 of these fillet radii. The radial rise of axis 33, and hence the overall deflection of springs 28 will be increased slightly to a distance 45, however the Hertzian contact stresses will be considerably reduced. Alternatively a slightly smaller roller may be used, preserving the kinematics of FIG. 6. As another alternative a contour of varying radius could be employed on the notches, as shown as contour 48 in FIG. 9. The radial rise distance 47 of centre 33 of cylindrical roller 22 will be a function of the shape of contour 48 however, again, the resulting maximum deflection of springs 28 (in this case 4 times distance 47) will be considerably reduced compared to the prior art case of triangular notches.

In the case of FIGS. 8 and 9 above, it is of course realized that forces on cylindrical roller 22 will only be balanced if the contours of notches 10 in input-shaft 1 are essentially identical in form to the contours of notches 20 in plunger 18. If this is not the case, cylindrical roller 22 may tend to slide rather than roll and therefore become misorientated. Irrespective of this, side faces 19 in carrier 11, which are positioned to limit the travel of cylindrical rollers 22 commensurate with the valve fail safe angle, ensure that, when the cylindrical rolling element passes through the 2-line contact (i.e. central) position with respect to either notch 10 or notch 20, the cylindrical roller will stop rolling and wait for the establishment of 2-line contact with the opposite notch before the normal rolling action of the detent is re-established. This arrangement therefore ensures correct orientation of the roller between the opposite notches at all times.

A second embodiment of the present invention will now be described in reference to FIGS. 10, 11, 12, 13 and 14.

In this second embodiment, input-shaft 50, prismatic notches 51, and cylindrical rollers 52 are substantially the same as for the earlier described first embodiment, and correspond to items 1, 10 and 22 respectively in FIGS. 2–9. Carrier 53 is flat faced and attached to sleeve 54 by two hexagonal headed screws 55 engaged in drilled and tapped holes 56 in the end face of sleeve 54. Rectangular notched plungers 57 again radially slides along the parallel side faces 58 of grooves 59 in carrier 53 with virtually zero clearance. The doubly trapped rolling action, resulting from geometry of prismatic notches 51 and 60 (the latter in notched plungers 57) and cylindrical rollers 52 is exactly the same as for the case of the first embodiment.

However, in this second embodiment, the radially innermost portion of notched plungers 57 also includes radiused dead stops 61 which, as in the case of side faces 19 in the first embodiment, serve to correct misorientation and limit the travel of cylindrical rollers 52. Also notched plungers 57 are loaded radially inwardly, not by coil springs 28 as in the first embodiment, but by two C springs 62 supported on contoured portion 63 of notched plungers 57. Axial restraint of cylindrical rollers 52, notched plungers 57 and C springs 62 is via cover plate 63. Cover plate 63 also acts as a non rotating washer for hexagonal headed screws 55 and also facilitates locking of these screws via tabs 64. C springs 62, although shown as being of uniform thickness, are of varying width measured in the axial direction. According to usual practice in the design of C springs, greatest width is used in their central region where maximum bending moment is to be sustained whereas their extremities, adjacent to their point of contact with contoured portion 63 of notched plungers 57, is subject to lesser bending moment and can therefore afford to be narrower. In this manner bending stresses are more uniformly distributed in the C spring compared to if the C spring was of uniform width and, for a given maximum stress level, provides minimum spring rate.

The symmetrically disposed C spring arrangement ensures minimum side loading between side faces 58 of grooves 59 and the sliding surfaces of notched plungers 57, thereby minimising friction and wear. It is, of course, possible that for certain applications the resilient member could consist of only a single C spring. The C spring could be manufactured from a single sheet of spring steel or, alternatively, multilayered or leaved.

For applications requiring a large amount of detent action, it is also possible that three notched plungers could be employed in the mechanical detent mechanism, mutually radially disposed at approximately 120 degrees around the input-shaft. Three C springs would then be used to mutually interconnect these plungers thereby avoiding any of the aforementioned side loading (refer to FIG. 14). Still alternatively, four notched plungers could be radially disposed at approximately 90 degrees around the input-shaft with an appropriate set of four C springs. In general though, the larger the number of plungers and C springs, the less the space or "footprint" available for the mounting screws. For applications to date, two plungers (and two C springs) have been found optimum.

However, no matter what form the resilient member takes, a particular feature of this second embodiment is the means by which the centring mechanism may be made to be aligned perfectly during the attachment of carrier 53 to sleeve 54. It is, of course, ideally necessary that the centring mechanism is precisely rotationally matched to the centring torque supplied by torsion bar 4, and that, when this torsion bar centring torque is zero, the opposed cylindrical rollers 52 are engaged in 4-line contact with the detent notches, (i.e. 2-line contact with each prismatic notch 51 and 60). For this to be possible consistent with normal engineering tolerances on such components, carrier 53 must be capable of fine adjustment both rotationally (i.e. in direction E) and radially (i.e. in direction C or D or in a combination thereof) prior to final securing.

The two large locating holes 65 in carrier 53 are a clearance fit compared to the major diameter of the threads of screws 55. Hence, if screws 55 are relaxed as during assembly, the entire mechanism will assume this ideal condition. Thereafter screws 55 are tightened to rigidly secure carrier 53 to sleeve 54. Tabs 64 of cover plate 63 are then deformed around the hexagonal heads of screws 55 for permanently locking these screws during the service life of the steering gear.

Note that with substantially all other designs of centring devices, including the earlier described first embodiment, the matching of the centring device with the torsion bar must be accomplished by a precise centring technique, and the centring action of the opposing (or even four) separate detents must be made to coincide through extreme precision of manufacture not required in the second embodiment just described.

It will be apparent to people skilled in the art of power assisted steering gears that numerous possible configurations of the present invention are feasible and most of the benefits outlined will result.

I claim:

1. A rotary valve for a power steering gear comprising an input-shaft, a sleeve, a driven member and an entirely mechanically actuated centring mechanism, the centring mechanism comprising at least one rolling element, each of said at least one rolling element being disposed between a pair of opposed notched elements, one notched element of each pair being rotationally fixed with respect to the input-shaft and the other notched element of each pair being rotationally fixed with respect to one of the sleeve and the driven member, each pair of opposed notched elements being urged together by spring means to trap one of the rolling elements between them, thereby producing a detent action between the input-shaft and one of the sleeve and driven member, whereby relative rotation occurs between the input-shaft and one of the sleeve and driven member only upon application of an input torque exceeding a predetermined threshold, wherein, after the predetermined threshold input torque has been exceeded, each rolling element rolls between opposite surface contours of the pair of opposed notched elements, the contours each including a convex surface, the shape of which is such that a centring torque between the input-shaft and one of the sleeve and driven member is produced which decreases for increasing amounts of rotation away from a neutral condition of the rotary valve.

2. A rotary valve as claimed in claim 1 wherein the rolling elements are cylindrical and make line contact with prismatically shaped contours in the notched elements.

3. A rotary valve as claimed in claim 2 wherein the rolling elements are disposed parallel to a central axis of the rotary valve.

4. A rotary valve as claimed in claim 1 wherein the locus of the centre of each rolling element during relative rotation is a curve having a radius substantially equal to the radius of the rolling element but slightly in excess thereof.

5. A rotary valve as claimed in claim 1 wherein the convex surfaces of the contours of the notched elements become parallel to the direction of relative displacement between the input shaft and one of the sleeve and driven member at large valve operating angles not associated with on-centre driving.

6. A rotary valve as claimed in claim 1 wherein forces produced by said spring means to produce a detent action act in an essentially radial direction with respect to a central axis of the rotary valve.

7. A rotary valve as claimed in claim 6 wherein each pair of notched elements consists in a first element formed on a plunger carried on a carrier attached to an end face of one of the sleeve and driven member and mounted for radial movement relative to the input shaft and a second element comprising a notch formed in the surface of the input shaft.

8. A rotary valve as claimed in claim 7 wherein the plungers are spaced diametrically apart and the spring means comprises at least one coil spring arranged to apply a load on each plunger.

9. A rotary valve as claimed in claim 7 wherein the plungers are spaced diametrically apart and the spring means comprises at least one C spring arranged to act between opposite plungers.

10. A rotary valve as claimed in claim 7 wherein there are at least three plungers spaced circumferentially around the input shaft and the spring means are a plurality of C springs each acting onto adjacent plungers.

11. A rotary valve for a power steering gear as recited in claim 1, wherein said one notched element of each pair is integral with the input shaft.

12. A rotary valve for a power steering gear as recited in claim 11, wherein said other notched element of each pair is integral with one of the sleeve and the driven member.

13. A rotary valve for a power steering gear as recited in claim 1, wherein said other notched element of each pair is integral with one of the sleeve and the driven member.

* * * * *